Patented June 27, 1950

2,512,599

UNITED STATES PATENT OFFICE 2,512,599

POLYTRIAZOLE COMPOSITIONS

Harold Bates, James Wotherspoon Fisher, and Edward William Wheatley, Spondon, near Derby, England, assignors to Celanese Corporation of America, a corporation of Delaware No Drawing. Application April 16, 1946, Serial No. 662,627. In Great Britain May 16, 1945

15 Claims. (Cl. 260—33.4)

This invention relates to improvements in polymer compositions and in the production of shaped articles, and is more particularly concerned with lacquers, coating compositions and the like, and with the production of articles such as filaments, films, sheets, moulded articles or the like from such compositions.

In U. S. application S. No. 662,628, filed April 16, 1946 and U. S. application S. No. 609,031 filed August 4, 1945, there is described a new series of polymers characterised by containing in its structural unit the triazole ring, specifically the 1.2.4-triazole ring. The specifications describe a range of polymers of different nitrogen content, from a product approximating to the nitrogen content to be expected in a polymer containing rings all of which are 4-amino-1.2.4-triazole rings to polymers approximating in nitrogen content to that to be expected in polymers containing substantially all 1.2.4-triazole rings without the exocyclic amino group. A number of methods of making such polymers are described in the specifications. To obtain the polymers of highest nitrogen content, it is advisable, as prescribed in the said specifications, to heat a dicarboxylic acid dihydrazide in presence of excess hydrazine or to use an equivalent procedure such as heating a dicarboxylic acid or its ester with more than two moles of hydrazine for each mole of dicarboxylic acid or ester. Products of lower nitrogen content may be obtained in a number of ways, for example by including in the reaction mixture ammonia either as such or combined with the dicarboxylic acid in the form of an amide or nitrile. Such polymers of lower nitrogen content have in addition a lower melting point than the polymers of higher nitrogen content. For example, in the case of using sebacic acid as the dicarboxylic acid, polymers of high nitrogen content have melting points up to about 250° or even 255° C., whereas products from the same dicarboxylic acid and having a lower nitrogen content may have melting points from 240° C. down to 200° C. or even 180° C. Such polymers of lower melting point and lower nitrogen content may be produced by an aftertreatment of polymers of high melting point and high nitrogen content, for example by a heat treatment in the absence of steam or hydrazine hydrate, or by an aftertreatment with cold nitrous acid followed by alkali.

As is indicated in the said specifications, if the polymers are of sufficiently high molecular weight, they may be formed into films or spun into filaments or used for making sheets or moulded articles. Acetic and formic acids and phenolic bodies are indicated as suitable solvents for working the products into various shaped articles, and in addition it is indicated that the polymers may be shaped from the melt with or without the aid of plasticisers, for example phenolic plasticisers, urea plasticisers and sulphonamide plasticisers.

We have now found that methanol and similar alcoholic bodies are true solvents for the triazole polymers of relatively low nitrogen content and melting point, and are latent solvents for the polymers of high nitrogen content and high melting point. Thus, in the case of the polymers from sebacic acid, while methanol and similar monohydric alcohols are not solvents of the polymers of melting point above about 245° C., they are true solvents for the polymers melting below about 240° C., the solvent power increasing with decreasing melting point. There is a similar transition point for the polymers formed from other dicarboxylic acids. Though methanol and similar alcoholic bodies are not true solvents for the polymers of high nitrogen content and high melting point, nevertheless when the methanol or like alcoholic body is mixed with chloroform, methylene chloride, benzene, toluene, nitromethane and similar polar chlorinated hydrocarbons, nitro bodies or aromatic hydrocarbons, the mixture constitutes a true solvent. Thus, for example, a mixture of 4 parts by volume of methanol and 1 part by volume of chloroform or benzene forms a very good solvent for a polyaminotriazole of high nitrogen content and high melting point formed from sebacic dihydrazide. The term "latent solvent" is used in this specification to connote a body which, while not being a true solvent, forms a true solvent when admixed with a minor proportion of another body, such as a polar chlorinated hydrocarbon, an aromatic hydrocarbon or a nitro body, which in itself is not a true solvent. Thus there is available a new range of solvents or solvent mixtures which may be utilised for the purpose of forming the polytriazoles into filaments, films or other shaped articles. Ethanol, the propanols and the butanols act in a similar way to methanol. The solvent mixtures such as methanol and chloroform, methanol and methylene chloride, methanol and benzene or toluene, recall the solvent mixtures which are used to dissolve cellulose acetate and ethyl cellulose.

The above solvents and solvent mixtures may likewise be used for the formulation of lacquers, coating compositions or the like with the usual ingredients, such as plasticisers, resins, colouring matters, pigments and the like.

The above solvent mixtures are true solvents not only for the products of high nitrogen content and high melting point, but also for the other polytriazoles of relatively low nitrogen content and melting point. We have further found that, instead of using these solvent mixtures, the alcoholic function of the methanol, ethanol or the like and the halogen function of the chloroform or methylene chloride or the aromatic function of the benzene or toluene or the nitro function of the nitromethane may be combined in a single solvent, as for example 1.1.1-trichlor-2-methyl-isopropanol (acetone/chloroform), 1.1.1-trichlor-2-propanol, the chlorhydrins, for example ethylene chlorhydrin and the glycerine chlorhydrins, benzyl alcohol and the nitro-alcohols, especially those obtained by condensation of nitromethane with one molecule of an aldehyde or ketone, for example 1-nitro-isopropanol, 2-nitro-n-propanol, 2-nitro-1-butanol, 1-nitro-2-butanol and 3-nitro-2-butanol.

We have further found that the glycols, for example ethylene glycol, propylene glycol, diethylene glycol, triethylene glycol, 1.4-butylene glycol, 1.6-hexylene glycol, glycerine and similar polyhydric alcohols, are good solvents for these polytriazoles whether of low or high nitrogen content and melting point. These glycols are particularly suitable for forming with the polytriazoles complexes or solid solutions which have lower melting points than the polytriazoles themselves, and hence enable filaments and films to be formed from the melt at lower temperatures than would otherwise be possible.

It will be noted that all the above solvents and latent solvents are alcoholic bodies, that is to say compounds containing an aliphatic hydroxy group. The true solvents for the polymers of high nitrogen content and high melting point have in addition to one aliphatic hydroxy group either at least one other aliphatic hydroxy group or another polar group or atom such as chlorine, an aromatic nucleus, a nitro group or the like. Generally the alcoholic bodies to be used have at the most eight carbon atoms in the molecule, and it is preferred to use bodies having at the most only four carbon atoms in the molecule. All the above examples of alcoholic bodies are of this type, with the exception of triethylene glycol, 1.6-hexylene glycol and benzyl alcohol. In addition to these indications with regard to the constitution of the alcoholic bodies to be used, it may be mentioned that they should be either liquids at ordinary temperatures or should be readily fusible without decomposition.

Solutions of the polytriazoles in any of the above solvents or solvent mixtures which are volatile may be formed into filaments or films by the evaporative method, that is to say by shaping followed by evaporation of the volatile solvent. In addition, the solutions may be used to form the polymers into filaments or films by wet methods, that is to say by extruding into a coagulating bath consisting of a non-solvent or mixture which does not precipitate the polymer too rapidly by which on the contrary has the property of gelling the polymer to some extent. Frequently the admixture of a rapid precipitating non-solvent with a proportion of a solvent gives the desired properties to the coagulating bath. To obtain the maximum draw-down of filaments spun into a bath containing such a mixture, the solvent is best used in a proportion not far short of that at which no precipitation occurs, for example a concentration 5% short of that value.

The following examples illustrate the invention but do not limit it in any way.

Example I 100 parts of the polymer obtained according to Example I or II of U. S. application S. No. 662,628, filed April 16, 1946, were refluxed in 1000 parts of methanol for a period of 1 hour. The solution was then filtered and concentrated by evaporation. It could then be spread on a film-forming surface and allowed to cool very gradually while permitting evaporation of the methanol. There was thus obtained a clear tough elastic film.

Example II 200 parts of a polyaminotriazole obtained from sebacic dihydrazide and having an intrinsic viscosity of 0.75 and a melting point of about 245° C. were refluxed in 1000 parts of a mixed solvent consisting of 800 parts by volume of methanol and 200 parts by volume of chloroform. The polymer dissolved completely in half an hour, the solution was filtered and could then be spread to give clear elastic films.

Example III 100 parts of the polymer used according to Example II were refluxed in 1000 parts of 3-chloro-1-propanol. Solution was complete in half an hour, and clear tough films could be spread direct from the solution by pouring on to a warm film-forming surface.

Example IV

The same polymer as is used in Example II, when mixed with ethylene glycol in the proportion of 60% of polyaminotriazole and 40% glycol had a melting point of 120° C. Such a mixture could be extruded from a melt spinning apparatus to give filaments which possessed substantial strength and a low lustre. It was found, however, that better results were obtained by using a lower proportion of ethylene glycol, as follows:

160 parts by weight of the polyaminotriazole were heated with 100 parts by weight of ethylene glycol to form a thick dope. Glycol was then removed by evaporation under nitrogen until the glycol content of the residual mixture corresponded with a composition consisting of 84% of polyaminotriazole and 16% of ethylene glycol. The product when cooled was a tough resilient mass having a melting point of about 150° C. and readily capable of yielding filaments from the melt. The product was introduced into a melt spinning apparatus and the temperature of the heating bath raised to 220° C., and was extruded under a pressure of nitrogen of 200–300 lbs. per square inch through orifices 0.15 mm. in diameter in a stainless steel jet. The usual distribution plates and filter gauges were arranged above the jet. Spinning was maintained at a speed of about 300 metres per minute to give filaments showing good strength and lustre and having marked elasticity.

Having described our invention, what we desire to secure by Letters Patent is:

1. Polymer composition comprising a linear poly-1.2.4-triazole resistant to hydrolysis by hydrochloric acid and a liquid alcohol containing at the most 8 carbon atoms.

2. Composition according to claim 1, wherein the polymer used has a nitrogen content approximating that of a polymer containing all 1.2.4-triazole rings free from exocyclic amino groups and is soluble in methanol.

3. Polymer composition comprising a linear poly-1.2.4-triazole resistant to hydrolysis by hydrochloric acid and as solvent a liquid alcoholic compound containing at the most 8 carbon atoms containing an additional polar group selected from the group consisting of alcoholic groups, chlorine atoms, phenyl and nitro groups.

4. Polymer composition comprising a linear poly-1.2.4-triazole resistant to hydrolysis by hydrochloric acid and a solvent mixture comprising a liquid alcohol containing at the most 8 carbon atoms and an additional compound selected from the group consisting of chlorinated aliphatic hydrocarbons, aromatic hydrocarbons of the benzene series and nitro-aliphatic hydrocarbons.

5. Polymer composition comprising a linear poly-4-amino-1.2.4-triazole resistant to hydrolysis by hydrochloric acid and as solvent a liquid alcoholic compound containing at the most 8 carbon atoms containing an additional polar group selected from the group consisting of alcoholic groups, chlorine atoms, phenyl and nitro groups.

6. Polymer composition comprising a linear poly-4-amino-1.2.4-triazole resistant to hydrolysis by hydrochloric acid and a solvent mixture comprising a liquid alcohol containing at the most 8 carbon atoms and an additional compound selected from the group consisting of chlorinated aliphatic hydrocarbons, aromatic hydrocarbons of the benzene series and nitro aliphatic hydrocarbons.

7. Polymer composition comprising a linear poly-aminotriazole resistant to hydrolysis by hydrochloric acid and formed from sebacic dihydrazide and as solvent a liquid alcoholic compound containing at the most 8 carbon atoms containing an additional polar group selected from the group consisting of alcoholic groups, chlorine atoms, phenyl and nitro groups.

8. Polymer composition comprising a linear poly-aminotriazole resistant to hydrolysis by hydrochloric acid and formed from sebacic dihydrazide and a solvent mixture comprising a liquid alcohol containing at the most 8 carbon atoms and an additional compound selected from the group consisting of chlorinated aliphatic hydrocarbons, aromatic hydrocarbons of the benzene series and nitro aliphatic hydrocarbons.

9. Process for the production of filaments and films which comprises shaping a composition according to claim 1 and removing the solvent from the shaped product.

10. Process for the production of filaments and films which comprises shaping a composition according to claim 3 and removing the solvent from the shaped product.

11. Process for the production of filaments and films which comprises shaping a composition according to claim 4 and removing the solvent from the shaped product.

12. Process for the production of filaments and films which comprises shaping a composition according to claim 5 and removing the solvent from the shaped product.

13. Process for the production of filaments and films which comprises shaping a composition according to claim 6 and removing the solvent from the shaped product.

14. Process for the production of filaments and films which comprises shaping a composition according to claim 7 and removing the solvent from the shaped product.

15. Process for the production of filaments and films which comprises shaping a composition according to claim 8 and removing the solvent from the shaped product.

HAROLD BATES.
JAMES WOTHERSPOON FISHER.
EDWARD WILLIAM WHEATLEY.

REFERENCES CITED

The following references are of record in the file of this patent:

UNITED STATES PATENTS

| Number | Name | Date |
|---|---|---|
| 2,218,077 | Zerweck | Oct. 15, 1940 |
| 2,252,555 | Carothers | Aug. 12, 1941 |
| 2,293,760 | Peters | Aug. 25, 1942 |
| 2,332,303 | D'Alelio | Oct. 19, 1943 |
| 2,377,985 | Watkins | June 12, 1945 |
| 2,395,642 | Prichard | Feb. 26, 1946 |

OTHER REFERENCES

Ser. No. 355,403, Thinius (A. P. C.), published Apr. 20, 1943.

Certificate of Correction

Patent No. 2,512,599 — June 27, 1950

HAROLD BATES ET AL.

It is hereby certified that error appears in the printed specification of the above numbered patent requiring correction as follows:

Column 3, line 68, for the word "by" before "which" read *but*;

and that the said Letters Patent should be read as corrected above, so that the same may conform to the record of the case in the Patent Office.

Signed and sealed this 3rd day of October, A. D. 1950.

[SEAL]

THOMAS F. MURPHY,
*Assistant Commissioner of Patents.*